3,776,909
4,6-DIAMONO-1(p-BENZYLOXYPHENYL-1,2-DI-HYDRO-2,2-DIMETHYL-s-TRIAZINES

Bernard R. Baker, deceased, by Reba Baker, legal representative, Santa Barbara, Calif., and Wallace T. Ashton, Charleston, S.C., assignors to the United States of America as represented by the Secretary, Department of Health, Education, and Welfare
No Drawing. Filed Apr. 19, 1972, Ser. No. 245,662
Int. Cl. C07d 55/20
U.S. Cl. 260—249.9      4 Claims

ABSTRACT OF THE DISCLOSURE

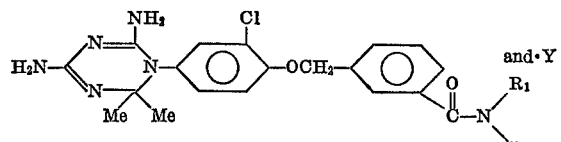

$NR_1R_2 = N(CH_3)_2$ and $N(C_2H_5)_2$
Y=pharmaceutically acceptable acid addition salts thereof
 where $R_1$ and $R_2$ are Me, the compounds are useful in inhibiting Walker 256 carcinosarcoma in rats as injectables utilizing a dosage range of about 0.1 to 6 mg./kg./day and also in inhibiting Dunning leukemia ascites in the same animal (because of transport by passive diffusion). This compound particularly has been found to have suitable transport across the blood/brain barrier in dogs.

THE INVENTION

This invention relates to compounds which satisfy the following configuration:

Formula 1

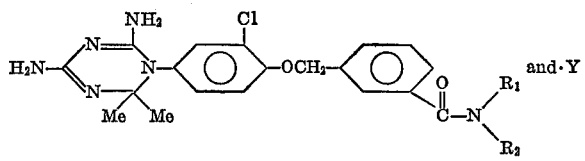

$NR_1R_2 = N(CH_3)_2$ and $N(C_2H_5)_2$
Y=pharmaceutically acceptable acid addition salts thereof Of particular interest in the present invention is the compound of the above formula wherein $R_1$ and $R_2$ are methyl and this compound (NSC 139105) may alternately be described as follows: 1-[3-chloro-4-(m-dimethylcarbomoylbenzyloxy)phenyl] - 4,6-diamino-1,2-dihydro-2,2-dimethyl-s-triazine ethanesulfonate In this invention the free base reacts with preferred acids of pharmaceutically acceptable solubility to form acid addition salts. Preferred reactant acids are: ethanesulfonic acid, methanesulfonic acid, hydrochloric acid, and sulfamic acid. Conversely, the acid addition salts may be converted to the free base by treatment with a base such as sodium hydroxide or sodium carbonate. The salt form is preferred generally over the free base for stability reasons relative to the triazine ring.

Compounds of the present invention have shown utility by demonstrated activity in standard biological tests in mammals or warm-blooded lower animals especially as to inhibiting Walker 256 ascites in rats and Dunning leukemia ascites in rats over a broad dose range.

The patented prior art relevant to the present invention may be illustrated by: 3,150,133 Capps (Parke, Davis), and the following literature citations are relevant:

Baker, B. R., et al., "Irreversible Enzyme Inhibitors," CLXXIII, J. Med. Chem., 13, 1130 (1970)
Folsch, E., and J. R. Bertino, "Inactivation by Mouse Serum of a Tightly Bound Inhibitor of Dihydrofolate Reductase," Molecular Pharmacology, 6, 93–96 (1970)
Baker, B. R., "Active-Site Directed Irreversible Inhibitors of Dihydrofolate Reductase," Am. N.Y. Acad. Sci., 186, 214–226 (1971)
Ashton, Wallace T., "Development of Water-Soluble Reversible Inhibitors of Dihydrofolate Reductase with Potent Antitumor Activity Derived from 4,6-Diamino-1,2 - Dihydro-2,2-Dimethyl-1-Phenyl-s-Triazine," excerpt from Ph. D. Thesis, University of California at Santa Barbara (1971), pp. 80–111 and 241–246 (to be published 1972 in J. Med. Chem. with Dr. B. R. Baker).

PREPARATION OF THE COMPOUNDS

As noted from the prior art in the patent to Capps cited above, the compounds can generally be produced by reaction of a p-benzyloxy aniline with dicyandiamide (cyanoguanidine) and acetone in the presence of a mineral acid. A direct preparation of an exemplary acid addition salt using ethanesulfonic acid as the salt-forming acid is set out post as Example 1.

The compounds in the present invention have been found to be presently active in animal studies for inhibiting Walker 256 ascites and Dunning leukemia ascites.

It is known that dihydrofolate reductase is the key enzyme involved in the synthesis of immediate precursors to DNA. When this enzyme is blocked by an appropriate inhibitor, DNA is not synthesized in the cell and this lack of new DNA aborts cell division and leads to the death of the cell. Such chemical antagonists are also known as folic acid antagonists which act by hindrance to block this essential growth factor and its related compounds concerned with the metabolic transfer involved. (See Frances E. Knock, Anticancer Agents, C. C. Thomas, 1967, pages 160–165.)

One class of dihydrofolate reductase inhibitor depends for its modus of action on the fact that the compounds are isosteric analogs of the enzyme's substrate, folate, and dihydrofolate. This class of inhibitors is represented by the compound Methotrexate (Amethopterin):

Formula 2

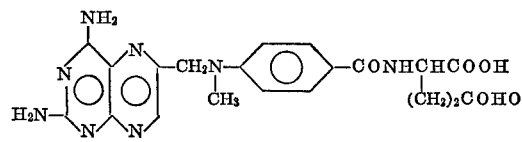

This class of inhibitors enters cells by the active transport system used for folate and dihydrofolate.

A second class of dihydrofolate reductase inhibitor is where the structure is radically different from that of folic acid and the inhibitor enters the cell by passive diffusion. Compounds of the present invention operating by passive diffusion have been found to be highly effective in inhibiting Walker 256 carcinosarcoma in the rat which is resistant to Methotrexate and has a limited transport of folic acid. With respect to the dimethyl compound (NSC 139105), a summary of data is given in Tables I–IV, indicating that an effective dosage range in mg./kg./day in Walker 256 in the rat is from about 0.1 to 6 and that where the preferred modus for this injectable is intraperitoneal (I.P.) and also the activity against Dunning leukemia is about 0.2 to 6 mg./kg./day and here in leukemia treatment the modus is as an injectable.

TABLE I.—TREATMENT OF WALKER 256 ASCITES WITH NSC-139105

| Group number | Mg./kg./day [a] | 40 day survivors [b] |
|---|---|---|
| A | 12.5 | Toxic |
|   | 6.25 | 5/6 |
|   | 3.1  | 6/6 |
|   | 1.56 | 6/6 |
|   | 0.78 | 6/6 |
| B | 0.78 | 5/6 |
|   | 0.39 | 4/6 |
|   | 0.20 | 6/6 |
|   | 0.10 | 6/6 |
| C | 0.8  | 5/6 |
|   | 0.4  | 4/6 |
|   | 0.2  | 6/6 |
|   | 0.1  | 6/6 |

[a] Days 1–9, i.p.
[b] Controls survived 8 days.

TABLE II

Delayed treatment of Walker 256 ascites with NSC-139105

| Mg./kg./day [a] | 45 day survivors [b] |
|---|---|
| 12.5 | 4/6 |
| 6.25 | 6/6 |
| 3.13 | 5/6 |
| 1.56 | 5/6 |
| 0.8  | 6/6 |
| 0.4  | 0/6 |
| 0.2  | 0/6 |

[a] Days 5–13 ip.
[b] Controls died day 9.

TABLE III.—TREATMENT OF INTRAMUSCULAR WALKER 256 WITH NSC-139105

| Group number | Mg./kg./day [a] | T/C [b] |
|---|---|---|
| F | 25 | 0 |
|   | 12.5 | 1 |
|   | 6.25 | 0 |
|   | 3.13 | 11 |
| G | 6.25 | 0 |
|   | 3.13 | 6 |
|   | 1.56 | 29 |
|   | 0.8  | 67 |
|   | 0.4  | 103 |

[a] Days 3–6, i.p.
[b] Ratio of tumor weights of treated group over control group.

TABLE IV

Treatment of Dunning leukemia with NSC-139105

| Mg./kg./day [a] | 43 day survivors [b] |
|---|---|
| 12.5 | Toxic |
| 6.25 | 2/6 |
| 3.13 | 2/6 |
| 1.56 | 3/6 |
| 0.8  | 5/6 |
| 0.4  | 3/6 |
| 0.2  | 6/6 |

[a] Days 1–9 i.p.
[b] Controls died day 6.

In published work by the present inventors, as in the Annals of the New York Academy of Science, 186, 1971, page 214 and page 219, noted above, the present inhibitors are designated as reversible inhibitors in that they lack such a group as —$SO_2F$ to irreversibly bind as with a hydroxyl group of the enzyme and thus depend in their action upon a competition mechanism. A typical known irreversible agent is NSC 113423, whose structure is as follows: N - [p-(4,6-diamino-1,2-dihydro-2,2-dimethyl-s-triazin-1-yl)hydrocinnamoyl] - 2 - methylsulfanilyl fluoride ethanesulfonate Finally, in a recently published article by the present inventors above at J. Med. Chem., 13, 1130, 1139 (1970) where analogous pairs of inhibitors were prepared by substituting H for $SO_2F$, then the resulting reversible inhibitor was not adversely affected in vivo against Walker 256.

The primary goal in the production and testing of these and related compounds is the production of a compound which would be so active and so soluble that it could be utilized specially in leukemia therapy presently in mammals and lower warm-blooded animals by an infusion method which would allow the optimum amount of time to cease the therapy should untowards side effects develop. In the course of testing here, it was found that mouse tumor systems and mouse leukemia systems were not predictive, since in some fashion the agents did not reach the target enzyme. It was determined that the present agents became bound to some constituents in mouse blood irreversibly and did not reach the cell. Since this undesired binding constituent was absent in human blood and also quite low in rat blood, the animal testing procedures were shifted to a rat tumor system and thus the Walker 256 rat tumor system was examined. Dr. E. Folsch and Dr. J. R. Bertino, in the Molecular Pharmacology article above theorize that the inactivating cellular factor in the mouse is probably a macromolecule since it was not dialyzable.

The fact that the compound does cross the blood/brain barrier is significant because leukemia does tend to invade the central nervous system and most of the major anti-leukemic drugs which are now in use are not capable of crosing the blood/brain barrier in significant concentration.

The choice of the optimum compound was selected from three compounds:

NSC 139105 1-[3-chloro-4-(m-dimethylcarbamoyl-benzyloxy)phenyl]-4,6-diamino - 1,2 - dihydro-2,2-dimethyl-s-triazine ethanesulfonate NSC 143010 1-[3 - chloro-4-(m-diethylcarbamoyl-benzyloxy)phenyl] - 4,6 - diamino-1,2-dihydro-2,2-dimethyl-s-triazine ethanesulfonate NSC 113423 N-[p-(4,6-diamino-1,2-dihydro-2,2-dimethyl-s-triazin-1-yl)hydro-cinnamoyl] - 2 - methylsulfanilyl fluoride ethanesulfonate (comparison)

In preliminary tests NSC 139105 had a substantial advantage in sustained cerebral spinal fluid level in dogs as compared with the related diethyl compound 143010.

The preferred NSC 139105 was also superior to the compound with the sulfonyl fluoride side chain, 113423. The 113423 compound achieved only a low maximum concentration in the CSF and its maximum CSF/plasma ratio was low.

It is believed that in part the results may have been influenced by the relative solubilities of the three compounds which are set out below:

NSC 139105—80 mg./ml. $H_2O$
NSC 143010—30 mg./ml. $H_2O$
NSC 113423—1.1 mg./ml. $H_2O$ (comparison)

Studies on animals showed that the present compounds are active agents against Walker 256 ascites, Dunning leukemia ascites, and I. M. Walker 256 ascites in the rat by injectable administration either intraperitoneal or intravenous.

Formula 3

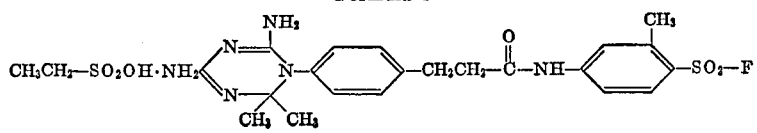

TABLE V

Distribution of  between plasma and CSF [a]

| R | Initial plasma conc.,[b] μM | Max, CSF level[c] Time, hr. | Max, CSF level[c] Conc., μM | Plasma conc. at time of max. CSF level, μM | Max. CSF/ plasma [d] |
|---|---|---|---|---|---|
| 3-Cl—4-OCH₂—⟨○⟩—CONMe₂ (NSC 139105) | 100–200 | 1.5 | 1.1 | 2.2 | 0.5 |
| 3-Cl—4-OCH₂—⟨○⟩—CONEt₂ (NSC 143010) | 200 | 1 | 0.06 | 13 | 0.005 |
| 4-(CH₂)₂CONH—⟨○⟩—SO₂F, CH₃ (NSC 113423) | 20 | 6–8 | 0.03 | 0.7 | 0.04 |
| [Amethopterin] | | | | | [e] <0.05 |

[a] Unpublished data of J. R. Bertino unless otherwise indicated.
[b] Concentration of inhibitor in blood plasma immediately after intravenous injection into dogs.
[c] Maximum concentration achieved by inhibitor in cerebrospinal fluid after intravenous administration.
[d] Ratio of concentration of inhibitor in CSF to concentration in plasma at time of maximum CSF level.
[e] Reported in D. P. Rall, Cancer Res., 25, 1572 (1965).

EXAMPLE 1

Preparation of 1-[3-chloro-4-(m-dimethylcarbamoylbenzloxy)phenyl]-4,6-diamino-1,2-dihydro - 2,2 - dimethyl-s-triazine ethanesulfonate—(NSC 139105)

The steps in the preparation of NSC 139105 are diagrammed below:

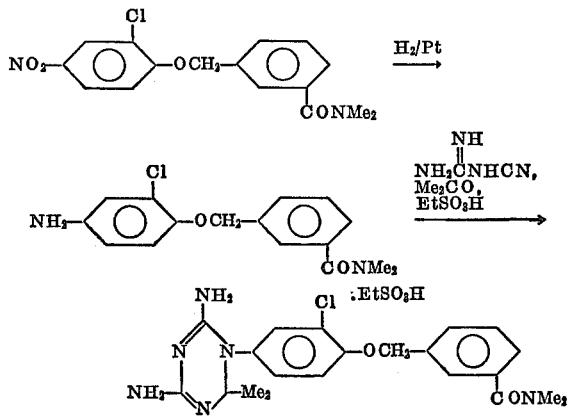

The nitro compound (M.P. 119°) prepared from α-(2-chloro-4-nitrophenoxy)-m-toluic acid by treatment with SOCl₂ in MeCN followed by reaction with Me₂NH in cold CH₂Cl₂, was converted to the amine by hydrogenation in the presence of PtO₂ catalyst. Formation of the diaminodihydro-s-triazine ring was accomplished by condensation of the amine with cyanoguanidine and acetone in the presence of ethanesulfonic acid.

A mixture of 9.2 g. (27.5 mmoles) of the nitro compound, 300 mg. of PtO₂, and 200 ml. of 2-methoxyethanol was shaken with hydrogen at 1–3 atm. for 5.5 hr., at which time the reaction had essentially stopped and TLC showed no evidence of starting material. The filtered solution was spin-evaporated in vacuo. To the residue of the amine were added 3.08 g. (28 mmoles) of ethanesulfonic acid, 2.60 g. (31 mmoles) of cyanoguanidine, and 80 ml. of acetone. The solution was refluxed with stirring, and precipitation of product began within 1 hr. After 42 hrs. the mixture was cooled and filtered. The product was washed with acetone, then recrystallized from i—PrOH—H₂O to give 10.5 g. (71%) of white crystals, M.P. 215–216° dec. (TLC in 2:1 H₂O—Me₂CO on silica gel).

*Analysis.*—(C₂₃H₃₁ClN₆O₅S): Calcd. (percent): C, 51.3; H, 5.80; N, 15.6. Found (percent): C, 51.1; H, 5.89; N, 15.5.

The embodiments of this invention in which an exclusive property or privilege is claimed are defined as follows:

1. 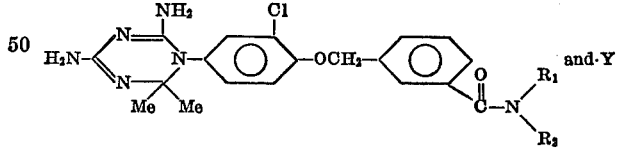 and ·Y

NR₁R₂=N(CH₃)₂ and N(C₂H₅)₂
   Y=pharmaceutically acceptable acid addition salts thereof 2. The compound according to claim 1 wherein NR₁R₂=N—(CH₃)₂.

3. The compound according to claim 1 wherein NR₁R₂=N—(CH₃)₂ and Y=C₂H₅SO₃H.

4. The compound according to claim 1 wherein NR₁R₂=N—(C₂H₅)₂ and Y=C₂H₅SO₃H.

References Cited
UNITED STATES PATENTS 3,074,947   1/1963   Elslager et al.   260—249.9
3,272,814   9/1966   Cultler et al.    260—249.9

JOHN M. FORD, Primary Examiner

U.S. Cl. X.R.
424—249